United States Patent Office 2,859,239
Patented Nov. 4, 1958

2,859,239

ACRYLIC ACID COMPOUNDS

Walter B. Trapp and Donald E. Pletcher, Midland, Mich., assignors to The Dow Chemical Company, Midland, Mich., a corporation of Delaware No Drawing. Application August 17, 1956
Serial No. 604,602

4 Claims. (Cl. 260—464)

This invention is concerned with cyclohexene-acrylic acid compounds having the general structure

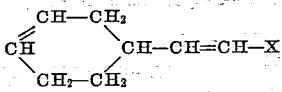

wherein X represents a member of the group consisting of carboxyl, cyano, carbamoyl, chlorocarbonyl, carbalkoxyl containing from 2 to 5 carbon atoms, inclusive, and carbalkenoxyl containing from 4 to 5 carbon atoms, inclusive.

The products of this invention are useful as constituents in perfumes and in compositions where artificial odor is desired. Further, these compounds are useful as parasiticides adapted to be employed as toxic constituents in compositions for the control of pests such as cockroaches, aphids, fungi, bacteria and nematodes. In addition, these compounds have utility as herbicides for the control of undesirable vegetation.

The compounds of the invention having the structure

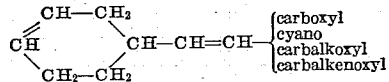

may be prepared by causing 3-cyclohexene-1-carboxaldehyde to react with an appropriate active methylene compound having the general structure

wherein Y represents a carboxyl, cyano, carbalkoxyl or a carbalkenoxyl radical and Z represents a carboxyl group or a salt thereof, to produce the desired compound and water of reaction.

In the synthesis, good results are obtained when substantially equimolar proportions of the reactants are employed. The reaction is carried out in the presence of a basic catalyst such as piperidine and trimethylamine, and takes place smoothly in the temperature range of from 80° to 110° C. A solvent may be employed as reaction medium, if desired. Suitable solvents include pyridine, picoline, benzene and water.

In carrying out the reaction, 3-cyclohexene-1-carboxaldehyde, an active methylene compound and a catalyst are mixed together in an appropriate solvent, if employed, and the mixture heated for a period of from 2 to 14 hours to form first an intermediate condensation product of 3-cyclohexene-1-carboxaldehyde and an active methylene compound and having a structure

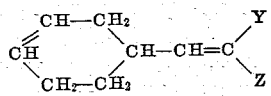

which decarboxylates to produce the desired cyclohexene-acrylic acid product. When Z is a carboxyl group, the decarboxylation usually takes place during the heating step. If decarboxylation does not occur during the heating step, mineral acid may be added and the mixture heated to effect decarboxylation, or the intermediate acid product isolated and heated to bring about decarboxylation and to obtain the desired product. When Z represents a carboxylic acid salt group, the reaction mixture containing the intermediate condensation product is acidified to bring about the decarboxylation. If a solvent is used in carrying out the reaction, the particular solvent employed is determined by whether the active methylene compound is employed as a free acid or a salt. When the starting material is a free acid, an organic solvent such as pyridine is employed. When the starting material is a salt, water is the preferred solvent.

After completion of the heating period, the reaction mixture is allowed to cool. When the reaction is carried out in an organic solvent, aqueous alkali is added to the reaction mixture to dissolve the acids present as their salts. The resulting mixture is then extracted with benzene to remove non-acidic benzene-soluble impurities and the aqueous solution then acidified to recover the free acid. The free acid is then purified by conventional procedures.

When the reaction is carried out in an aqueous solution, the non-acidic material is extracted from the reaction mixture with an inert organic solvent such as normal-hexane or benzene. The aqueous solution is then acidified to precipitate the desired product. The latter is isolated employing conventional means.

The compounds of the invention having the structure

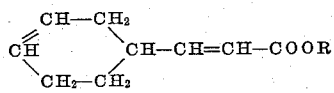

wherein R represents an alkyl or alkenyl radical may also be prepared by esterification of 3-cyclohexene-1-acrylic acid with the appropriate alcohol. In a method for carrying out the reaction, 3-cyclohexene-1-acrylic acid and the appropriate alcohol are heated together in the presence of a catalyst to produce the desired ester and water of reaction. The reaction is carried out under conditions adapted to separate the water of reaction as it is formed. This may be accomplished by adding calcium chloride to the reaction mixture or by adding benzene to the mixture to distill out the water formed as a benzene-water azeotrope. The usual esterification catalysts may be employed. The preferred catalysts are sulfuric acid or an acidic resin such as Dowex 50 resin (a sulfonated styrene-divinylbenzene copolymer). After completion of the heating the mixture may be freed of catalyst by filtration if a resin catalyst has been employed, and the desired product isolated from the reaction mixture by conventional means such as fractional distillation. When a sulfuric acid catalyst has been employed, the reaction mixture is neutralized before conventional separation procedures are employed.

3-cyclohexene-1-acrylyl chloride having the structure

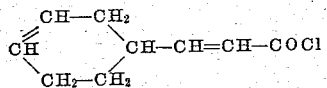

may be prepared by the action of thionyl chloride on 3-cyclohexene-1-acrylic acid. In carrying out the latter reaction, 3-cyclohexene-1-acrylic acid and thionyl chloride are mixed together. The reaction mixture is maintained in the temperature range of from 25° to 40° C. for a period of from 8 to 16 hours. Thereafter the unreacted thionyl chloride is stripped by heating under reduced pressure and the residue fractionally distilled to obtain the desired product.

3-cyclohexene-1-acrylamide having the structure

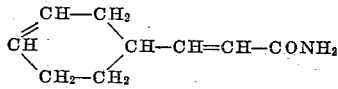

may be prepared by the action of ammonia on 3-cyclohexene-1-acrylyl chloride. In carrying out the latter reaction, 3-cyclohexene-1-acrylyl chloride is added with cooling to aqueous ammonium hydroxide to produce the desired 3-cyclohexene-1-acrylamide product and ammonium chloride by-product. The products precipitate in the reaction mixture as crystalline solids. Water is added to the mixture to dissolve the ammonium chloride by-product. The resulting aqueous mixture is filtered to recover the desired amide product.

Alternatively, gaseous ammonia may be bubbled through a solution of the acid chloride in an inert solvent to precipitate the desired 3-cyclohexene-1-acrylamide product. The latter may be isolated by filtration.

The following examples illustrate the invention but are not to be construed as limiting.

*Example 1.—3-cyclohexene-1-acrylic acid*

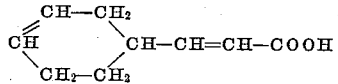

220 grams (2 moles) of 3-cyclohexene-1-carboxaldehyde was added to a solution of 208 grams (2 moles) of malonic acid in 300 grams of pyridine. The mixture was cooled to 12° C. and 5 to 6 drops of piperidine added thereto. The resulting mixture was allowed to warm gradually to room temperature and finally heated on the steam bath at 80°–90° C. for approximately 14 hours. Carbon dioxide gas continuously evolved from the mixture during the heating period. After completion of the heating, 800 milliliters of aqueous 10 percent sodium hydroxide solution was added to the mixture. The alkaline mixture was extracted three times with benzene to remove non-acidic material. The aqueous portion was heated under 70 millimeters pressure to distill off pyridine and part of the water. The residual aqueous salt solution was neutralized with dilute sulfuric acid whereupon a solid precipitated. The solid was recovered by filtration and recrystallized three times from 40–50 percent aqueous acetic acid to obtain a 3-cyclohexene-1-acrylic acid product melting at 50°–52° C. The yield of the product was 250 grams or 81 percent of theoretical.

*Example 2.—Methyl 3-cyclohexene-1-acrylate*

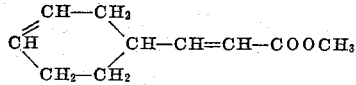

76 grams (0.5 mole) of 3-cyclohexene-1-acrylic acid, 385 grams (12 moles) of methanol, about 12 grams of calcium chloride and some methanol washed Dowex 50 resin catalyst were mixed together and heated under reflux for approximately 20 hours. After completion of the heating, the mixture was cooled and filtered to separate the catalyst. The filtrate was heated to distill out the major portion of the methanol and to recover a residual oil. The latter was extracted with an equal volume of benzene and the benzene extract heated to strip the benzene and then fractionally distilled to obtain a methyl 3-cyclohexene-1-acrylate product boiling at 90° C. at 1 millimeter pressure. This product had a refractive index, $n_D^{25°\ C.}$ of 1.490 and a specific gravity of 1.008 at 25° C./4° C.

*Example 3.—Allyl 3-cyclohexene-1-acrylate*

70 grams (0.46 mole) of 3-cyclohexene-1-acrylic acid, 300 milliliters (256 grams, 4.4 moles) of allyl alcohol, 10 drops of concentrated sulfuric acid and 50 milliliters of benzene were mixed together and heated for 14 hours at the boiling temperature of allyl alcohol. During the heating a reaction took place with the formation of the desired ester product and water of reaction. The latter was distilled out of the reaction zone during the heating, as a benzene-water azeotrope. After completion of the heating, the mixture was allowed to cool. The pH was then adjusted to 7 with aqueous sodium hydroxide solution and the major portion of the allyl alcohol removed from the mixture by distillation. An equal volume of benzene was added to the residue mixture to dissolve the ester product. The benzene solution was heated to remove the water and solvent, and then fractionally distilled to obtain allyl 3-cyclohexene-1-acrylate boiling at 97° C. at 0.7 millimeter pressure, and having a refractive index, $n_D^{25°\ C.}$ of 1.496 and a specific gravity of 0.996 at 25° C./4° C.

*Example 4.—3-cyclohexene-1-acrylonitrile*

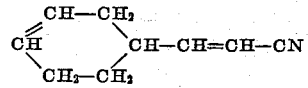

189 grams (2 moles) of chloroacetic acid was neutralized to a pH of 7 with about 160 grams of 50 percent sodium hydroxide solution while the temperature was kept below 25° C. The sodium chloroacetate solution thus prepared was mixed with a solution of 101 grams (2.08 moles) of sodium cyanide in 200 grams of water and stirred slowly over a period of about 2.5 hours. During this period, the temperature rose slowly to about 76° C. and then dropped to about 40° C. The resulting sodium cyanoacetate solution amounted to 763 milliliters. The solution was brought to a pH of 7 by the addition of dilute hydrochloric acid. The cyanoacetate solution was mixed with 165 grams (1.5 moles) of 3-cyclohexene-1-carboxaldehyde. 1.0 milliliter of piperidine was added to the resulting mixture and the latter heated at 157° C. under reflux and with stirring for one hour. Thereafter, the mixture was allowed to cool, pellets of sodium hydroxide were added to make the pH slightly over 7, and an additional 1 milliliter of piperidine was added thereto. The resulting mixture was heated at 107° C. for 2 hours. During the heating a reaction took place as indicated by the disappearance of the oily aldehyde layer. The resulting solution was cooled and extracted twice with normal-hexane to remove unreacted aldehyde. The residual aqueous solution was acidified with dilute sulfuric acid whereupon the evolution of carbon dioxide gas and the precipitation of an oil took place. The oil was separated from the aqueous portion with a separatory funnel. The aqueous portion was extracted with benzene. The benzene extract and the separated oil were combined and dried by slurrying with anhydrous calcium sulfate. The dry solution was stripped of the benzene and fractionally distilled to obtain a 3-cyclohexene-1-acrylonitrile product boiling at 105° C. at 5.6 millimeters pressure, and having a refractive index $n_D^{25°\ C.}$ of 1.501, a specific gravity of 0.9707 at 25° C./4° C.

*Example 5.—3-cyclohexene-1-acrylyl chloride*

15.2 grams (0.1 mole) of 3-cyclohexene-1-acrylic acid and 15 grams (0.127 mole) of thionyl chloride were mixed together. The resulting mixture was maintained in the temperature range of from 25° to 40° C. for 12 hours. After completion of the reaction, the unreacted thionyl chloride was stripped by heating under reduced pressure and the residue fractionally distilled to obtain a 3-cyclohexene-1-acrylyl chloride boiling at 130°–135° C. at 30–33 millimeters pressure and having a refractive index, $n_D^{25°\ C.}$ of 1.518. The product had a chlorine content of 20.6 percent. The theoretical value is 20.8 percent.

Example 6.—3-cyclohexene-1-acrylamide 68 grams (0.4 mole) of 3-cyclohexene-1-acrylyl chloride was added dropwise with cooling to 150 grams of a 28 percent ammonium hydroxide solution. A reaction took place with the formation of a white precipitate consisting of a mixture of a 3-cyclohexene-1-acrylamide product and ammonium chloride by-product. Water was then added to dissolve the ammonium chloride and the resulting mixture filtered to recover a 3-cyclohexene-1-acrylamide product melting at 53°–56° C. The product had a nitrogen content of 9.11 percent. The theoretical value is 9.26 percent.

Example 7.—Ethyl 3-cyclohexene-1-acrylate 110 grams (1 mole) of 3-cyclohexene-1-carboxaldehyde is added to a solution of 132 grams (1 mole) of monoethyl malonate in 180 grams of pyridine. A few drops of piperidine is added thereto and the resulting mixture heated on the steam bath for 12 hours. Carbon dioxide gas continuously evolves from the mixture during the heating period and an ethyl 3-cyclohexene-1-acrylate product is produced. The major portion of the pyridine is allowed to evaporate and the residual oil washed with water. The oil is dissolved in benzene and heated to remove the water and solvent and then fractionally distilled to obtain an ethyl 3-cyclohexene-1-acrylate product having a molecular weight of 180.

Example 8.—Secondary-butyl 3-cyclohexene-1-acrylate 76 grams (0.5 mole) of 3-cyclohexene-1-acrylic acid, 370 grams (5 moles) of secondary-butyl alcohol, 2 grams of Dowex 50 resin catalyst and 50 milliliters of benzene are mixed together and heated for 14 hours at the boiling temperature of the alcohol. During the heating a reaction takes place with the formation of the desired ester product and water of reaction. The latter is allowed to distill from the mixture during the heating, as a benzene-water azeotrope. After completion of the heating the mixture is allowed to cool and filtered to separate the catalyst. The filtrate is heated to distill out the secondary-butyl alcohol and to recover a secondary-butyl 3-cyclohexene-1-acrylate product having a molecular weight of 208.

Example 9.—Crotyl 3-cyclohexene-1-acrylate

In a reaction carried out in a manner similar to that described in Example 7, 76 grams (0.5 mole) of 3-cyclohexene-1-acrylic acid, 360 grams (5 moles) of crotyl alcohol, 2 grams of Dowex 50 resin catalyst and 50 milliliters of benzene are mixed together and heated for 12 hours to produce the desired ester and water of reaction. The crude ester is isolated and purified in a manner similar to that previously described to obtain a crotyl 3-cyclohexene-1-acrylate product having a molecular weight of 206.

In a similar manner the following esters are prepared:

Normal-propyl 3-cyclohexene-1-acrylate by the reaction of normal-propyl alcohol with 3-cyclohexene-1-acrylic acid.

Normal-butyl 3-cyclohexene-1-acrylate by the reaction of normal-butyl alcohol with 3-cyclohexene-1-acrylic acid.

α-Methylallyl 3-cyclohexene-1-acrylate by the reaction of α-methylallyl alcohol with 3-cyclohexene-1-acrylic acid.

The products of this invention are useful as perfume aromatics and are adapted to be employed in compositions where introduction of artificial odor is desired. These compounds may also be used as toxic constituents in insecticides, particularly for the control of cockroaches. They may also be used as herbicides for the control of undesirable vegetation such as rape and canary grass. Further, these compounds are useful as parasiticides and are adapted to be employed as toxic constituents in bactericidal and fungicidal preparations. In a representative operation, 3-cyclohexene-1-acrylic acid was added to nutrient agar media to give a concentration of 0.05 percent and the media inoculated with *Rhizopus nigricans* and incubated at 30° C. for 4 days. At the end of this period complete inhibition of growth of the test organism was observed.

The 3-cyclohexene-1-carboxaldehyde employed in this invention may be prepared by heating together under pressure butadiene and acrolein in the presence of a polymerization inhibitor such as 4-tertiary-butylcatechol until a pressure drop is noted. The reaction mixture may then be distilled to obtain the desired 3-cyclohexene-1-carboxaldehyde having a refractive index, $n_D^{25°\ C.}$ of 1.470.

We claim:

1. A compound having the structure

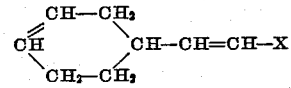

wherein X represents a member of the group consisting of cyano, carbalkoxyl containing from 2 to 5 carbon atoms, inclusive, and carbalkenoxyl containing from 4 to 5 carbon atoms, inclusive.

2. Methyl 3-cyclohexene-1-acrylate.
3. Allyl 3-cyclohexene-1-acrylate.
4. 3-cyclohexene-1-acrylonitrile.

References Cited in the file of this patent

Snyder et al.: J. A. C. S., vol. 72, 4096–4103 (1950).
Chem. Abst., vol. 48 (1954), subject index, p. 585s.